United States Patent [19]

Castonguay et al.

[11] Patent Number: 4,884,048

[45] Date of Patent: Nov. 28, 1989

[54] MOLDED CASE CIRCUIT BREAKER CURRENT TRANSFORMER ASSEMBLY

[75] Inventors: Roger N. Castonguay, Terryville; Joseph M. Palmieri, Southington; Graham A. Scott, Avon, all of Conn.

[73] Assignee: General Electric Company, New York, N.Y.

[21] Appl. No.: 299,179

[22] Filed: Jan. 18, 1989

[51] Int. Cl.[4] .................... H02B 1/08

[52] U.S. Cl. .................... 335/18; 200/303; 361/115; 361/357; 335/202

[58] Field of Search .................... 200/50 A, 50 C, 56 R, 200/303, 306, 308, 309; 335/6, 18, 8–10, 13, 14, 42, 132, 172, 176, 202; 336/65, 105; 361/38, 92, 94, 102, 115, 346, 356, 357, 379, 383, 412, 413, 415, 417–420, 426

[56] References Cited

U.S. PATENT DOCUMENTS

| | | | |
|---|---|---|---|
| 4,281,359 | 7/1981 | Bayer | 335/18 |
| 4,470,627 | 9/1984 | Link | 335/16 |
| 4,591,942 | 5/1986 | Willard et al. | 361/97 |
| 4,652,975 | 3/1987 | Scott | 361/404 |
| 4,728,914 | 3/1988 | Morris et al. | 335/6 |
| 4,741,002 | 4/1988 | Dougherty | 377/49 |
| 4,754,247 | 6/1988 | Raymont et al. | 335/202 |
| 4,788,621 | 11/1988 | Russell | 361/92 |
| 4,794,356 | 12/1988 | Yu | 361/115 |

*Primary Examiner*—Gerald P. Tolin

*Attorney, Agent, or Firm*—Richard A. Menelly; Walter C. Bernkopf; Fred Jacob

[57] ABSTRACT

A circuit breaker enclosure consists of a cover and a case designed for robotic assembly of the circuit breaker components. A current transformer assembly and a printed wire board containing the electronic trip unit circuit are precisely positioned within the case and cover by means of a transitory circuit breaker case support platform. The transitory support platform includes four upstanding posts that pass through openings formed in the circuit breaker case and are received within corresponding openings through the circuit breaker cover. Leads extending from the current transformer assembly within the case become automatically positioned within corresponding openings through the printed wire board by means of tapered lead-in openings formed within the circuit breaker cover.

10 Claims, 6 Drawing Sheets

MOLDED CASE CIRCUIT BREAKER CURRENT TRANSFORMER ASSEMBLY

BACKGROUND OF THE INVENTION

Industrial molded case circuit breakers containing electronic trip units are capable of providing a number of accessory functions. One such circuit breaker is described within U.S. Pat. No. 4,754,247. The electronic trip unit allows a single industrial circuit breaker design to be used over a wide range of circuit breaker ampere frame ratings and also lends to automated assembly of the circuit breaker component parts.

When electronic trip units are employed, current-sensing transformers are required for sensing the circuit current an providing the current signals to the electronic trip unit for processing. When the current transformers are assembled within the circuit breaker case and the printed wire board containing the electronic trip unit is contained within the circuit breaker cover, automatic means are required for accurately aligning the transformer pin connectors extending from the current transformers with corresponding connectors on the printed wire board.

One purpose of the instant invention is to provide a circuit breaker enclosure consisting of a circuit breaker cover and case, each of which includes positioning means for promoting accurate interconnection between the current transformers in the circuit breaker case and the printed wire board contained within the circuit breaker cover.

SUMMARY OF THE INVENTION

A circuit breaker transitory support pallette includes four upstanding posts that are received within four thru-holes formed within the circuit breaker case. The upstanding posts then accurately position the circuit breaker cover over the case by four corresponding thru-holes formed within the circuit breaker cover. Electrical connection pins upstanding from the current transformers mounted within the case are automatically directed through tapered openings formed within the circuit breaker cover subjacent the trip unit printed wiring board. Electrical connection between corresponding pins on the printed wire board and the current transformer pins is made by means of a robotic wire wrap operation.

DESCRIPTION OF THE PREFERRED EMBODIMENT

Figure 1:
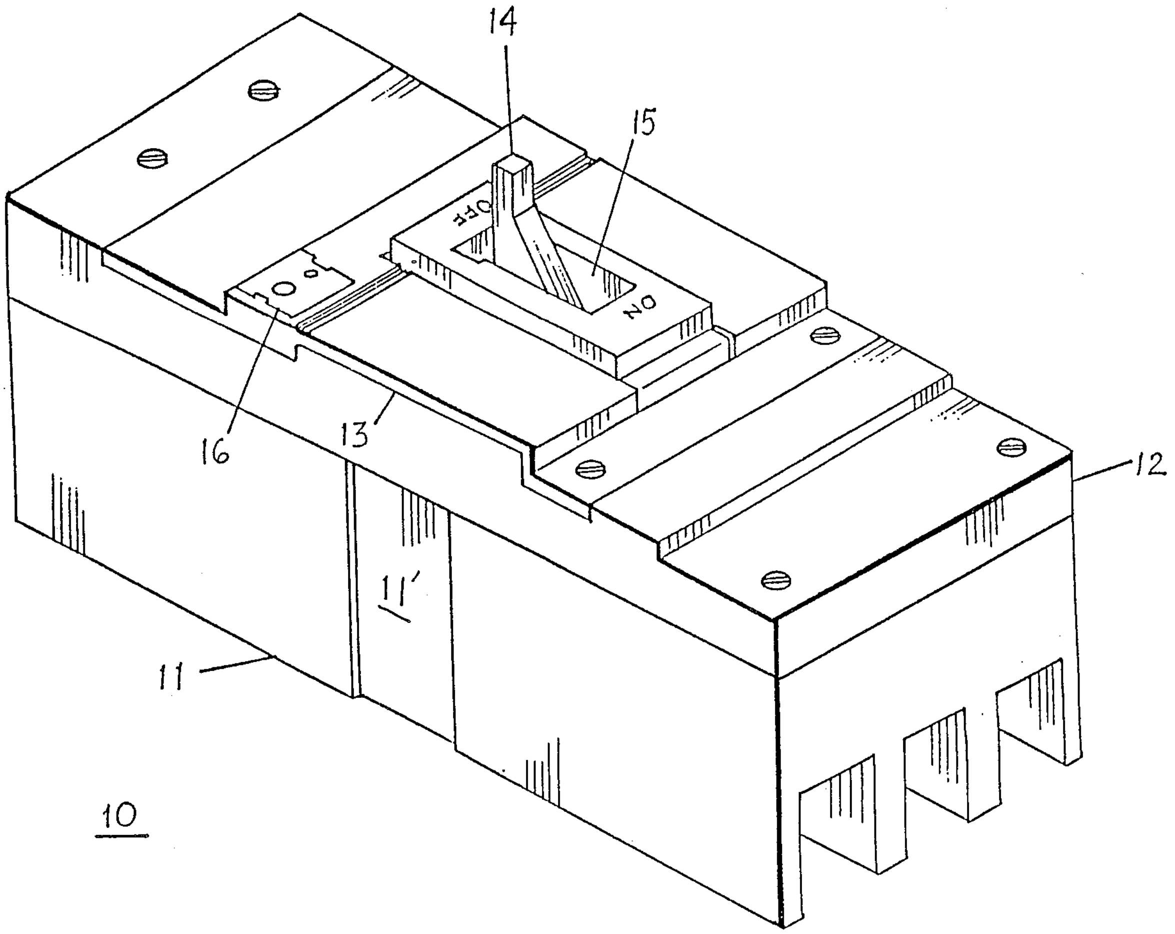
FIG. 1 is a top perspective view of an industrial molded case circuit breaker containing an electronic trip unit in accordance with the invention.

An electronic trip circuit breaker 10 is depicted in FIG. 1 wherein the circuit breaker case 11 containing the circuit breaker components is sealed by means of a circuit breaker cover 12 and an accessory cover 13. The circuit breaker is switched ON and OFF by means of a handle operator 14 which projects through the handle slot 15 formed within the circuit breaker cover 12. An externally-accessible rating plug 16 fits within the accessory cover for setting the circuit breaker ampere rating. A wiring access slot 11' formed in the side of the case provides for the egress of electrical wire conductors for internally accessing the circuit breaker accessories contained therein.

Figure 2:
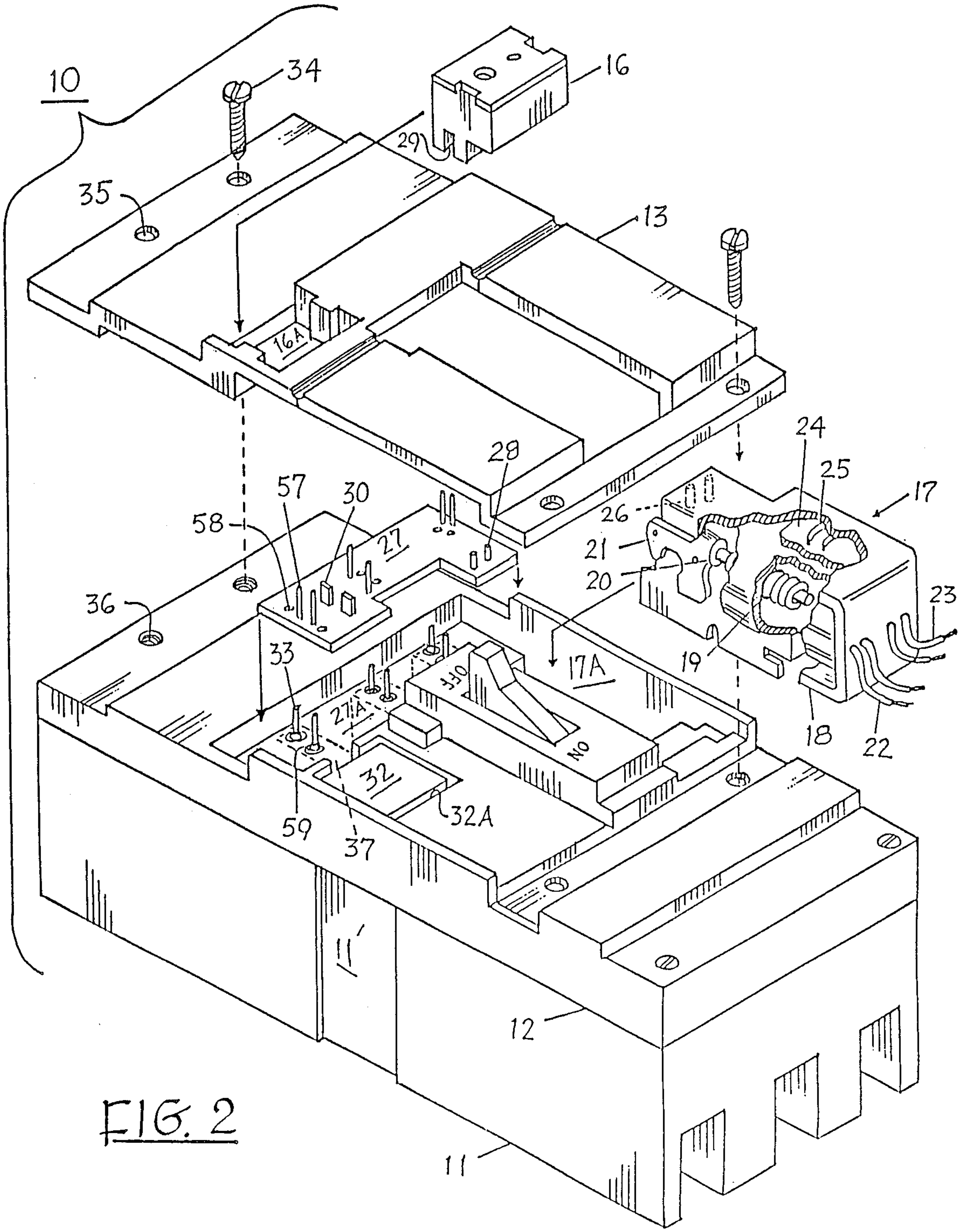
FIG. 2 is a top perspective view in isometric projection of the circuit breaker components of the circuit breaker of FIG. 1 prior to assembly.

The electronic circuit breaker 10 is depicted in FIG. 2 with the current transformers 37 already assembled within the circuit breaker case 11 such that the transformer pin connectors 33 extend upwards through the openings 59 formed in the printed wire board recess 27A. Three such transformers are employed, one for each separate phase of the electrical distribution circuit to which the electronic circuit breaker is connected. The auxiliary switch 32 is depicted within the auxiliary switch recess 32A prior to insertion of the actuator-accessory unit 17 within the actuator access 17A and the insertion of the printed wire board 27 within the printed wire board recess 27A. When these components are inserted within the respective recesses within the cover 12, the accessory cover 13 is attached by means of screws 34, thru-holes 35 and threaded openings 36 at which time the rating plug 16 is next inserted within the rating plug recess 16A to complete the electronic circuit breaker assembly. The printed wire board 27 contains an electronic trip circuit such as that described within U.S. Pat. No. 4,741,002 which Patent is incorporated herein for purposes of reference. The printed wire board electrically connects with the current transformers 37 by attachment between the pins 57 upstanding on the printed wire board next to the thru-holes 58 through which the transformer pin connectors 33 extend as will be discussed below in greater detail. When the printed wire board is electrically connected with the current transformers, the actuator-accessory unit 17 is positioned over a part of the printed wire board such that the printed wire board pins 28 are received within the connector sockets 26 that are formed within the undervoltage release and shunt trip printed wire board 24 situated within the housing 18. The actuator-accessory unit is described within U.S. Pat. No. 4,788,621 which Patent is incorporated herein for reference purposes. A good description of the undervoltage and shunt trip circuit is found within U.S. patent application Ser. No. 176,589 filed Apr. 1, 1988, which Application is incorporated herein for reference purposes. The rating plug 16 connects with the printed wire board 27 by positioning the connectors 29 formed on the bottom of the rating plug over the pins 30 upstanding from the printed wire board. The rating plug is described within U.S. Pat. No. 4,728,914, which Patent is also incorporated herein for purposes of reference. As further described in aforementioned U.S. Pat. No. 4,788,621, the actuator-accessory unit includes an electromagnetic coil 19 that interacts with a plunger 20 to control the operation of the actuator lever 21 to electrically disconnect the circuit breaker upon internal signals generated by the printed wire board 27 as well as by external signals supplied to the undervoltage and shunt trip printed wire board 24. The actuator-accessory unit connects with a remote voltage source by means of conductors 22 to provide undervoltage release facility and with a remote switch by means of conductors 23 to provide shunt trip facility to the actuator-accessory unit. The solenoid 19 electrically connects with the undervoltage and shunt trip printed wire board 24 over conductors 25. To more clearly depict the arrangement of the assembly of the current transformers 37 and the printed wire board 27 the circuit breaker case 11 and cover 12 are reversed in FIGS. 3–7 with respect to the arrangements shown in FIGS. 1, 2 and 9.

Figure 3:
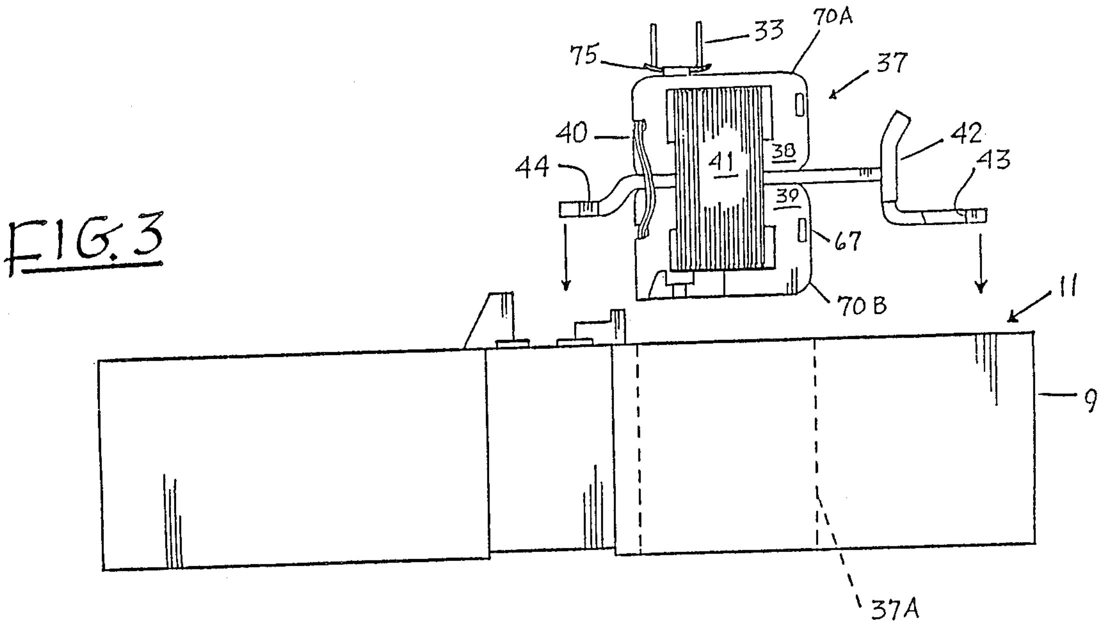
FIG. 3 is a side view of the circuit breaker case of FIG. 2 with the current transformer assembly in isometric projection.

The current transformer 37 is depicted in FIG. 3 prior to insertion within the current transformer compartment 37A within the electronic circuit breaker case 11. The current transformer is similar to that described within U.S. Pat. No. 4,591,942, which Patent is incorporated herein for reference purposes, and consists of a top and a bottom winding 38, 39 each contained within respective insulative bobbins 7OA, 7OB surrounded by an external core 41. The bobbin is fabricated from a plastic composition such as NORYL, which is a General Electric Trademark for thermoplastic resin and includes a top and bottom guide extension 67 for assisting in aligning the current transformers within the circuit breaker case in the manner to be described below in greater detail. The windings connect with each other and with the transformer pin connectors 33 by means of conductors 40 and a filter capacitor 75 is electrically connected across the pin connectors. The load strap 42 extends through the current transformer with one threaded opening 43 proximate the load end 9 of the circuit breaker case 11 and with a second threaded opening 44 near the center of the circuit breaker case. The second threaded opening receives the fixed contact assembly (not shown).

Figure 4:
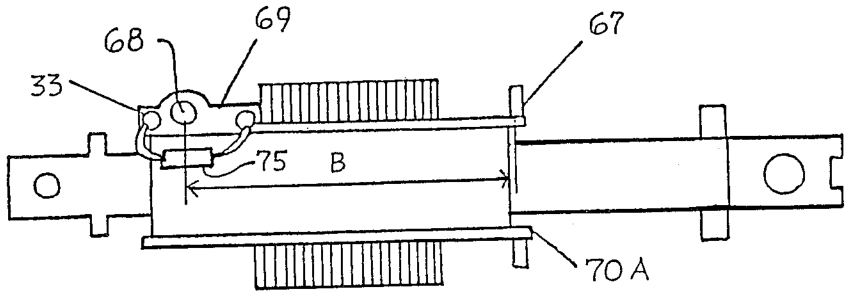
FIG. 4 is a plan view of the current transformer used within the circuit breaker of FIGS. 1 and 2.
Figure 5:
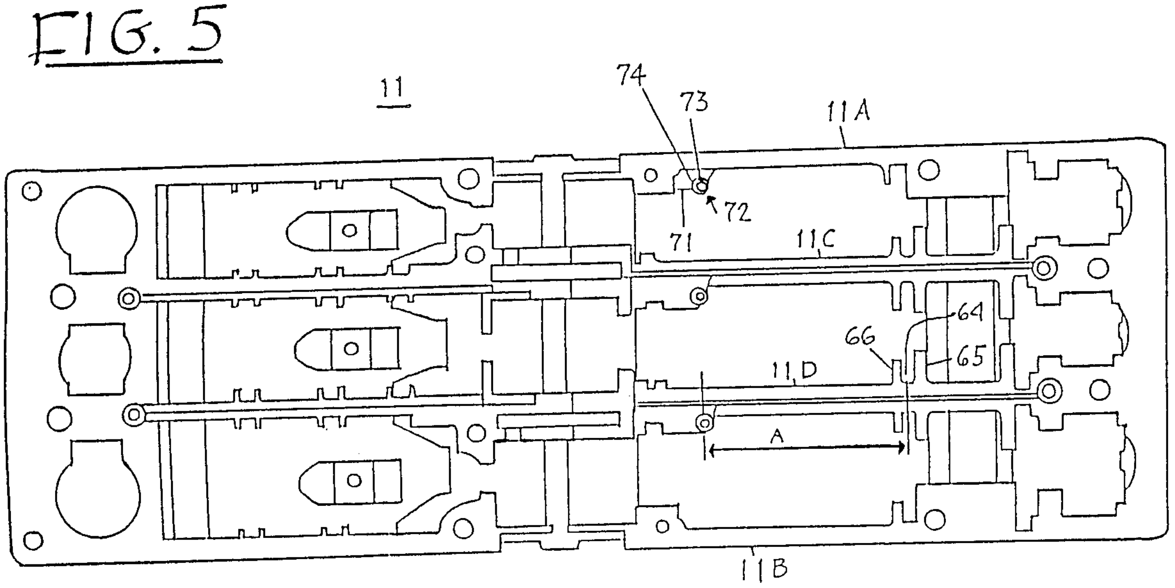
FIG. 5 is a plan view of the circuit breaker case of FIG. 2 prior to assembly of the circuit breaker components.

The current transformer 37 is inserted within the circuit breaker case 11 in the manner best seen by referring now to FIGS. 4 and 5. As described earlier, the current transformer bobbin 70A includes guide extensions 67 integrally-formed on both sides thereof.The guide extensions are formed on both the top and bottom bobbins 70A, 70B although only the top bobbin 70A is visible in FIG. 4. The guide extensions 67 formed on opposite sides of both of the bobbins are inserted within the guide slots 64 that are defined between projections 65, 66 integrally-formed on the side walls 11A, 11B and the inner walls 11C, 11D within the circuit breaker case 11 shown in FIG. 5. Positioning the guide extensions 67 within the respective guide slots 64 exactly locates the thru-holes 68 formed within the platforms 69 over the positional posts 72 integrally-formed on the pedestals 71 which are integrally-formed in the bobbin 70A as indicated in FIG. 5. The thru-holes 68 are formed within the platforms intermediate the pin connectors 33, next to the filter capacitor 75. To accurately locate the positional posts within the corresponding thru-holes, the top diameter 73 of the positioning posts is smaller than, and gradually tapers outward to the larger diameter 74, that constitutes the remainder of the positional posts. The precise alignment between the positional posts and the thru-holes is seen by the exact distance set between the center of the guide slot 64 and the center of the positioning post 72, indicated at A in FIG. 5, and the exact distance between the center of the guide extension 67 and the center of the thru-hole 68 indicated at B in FIG. 4.

Figure 6:
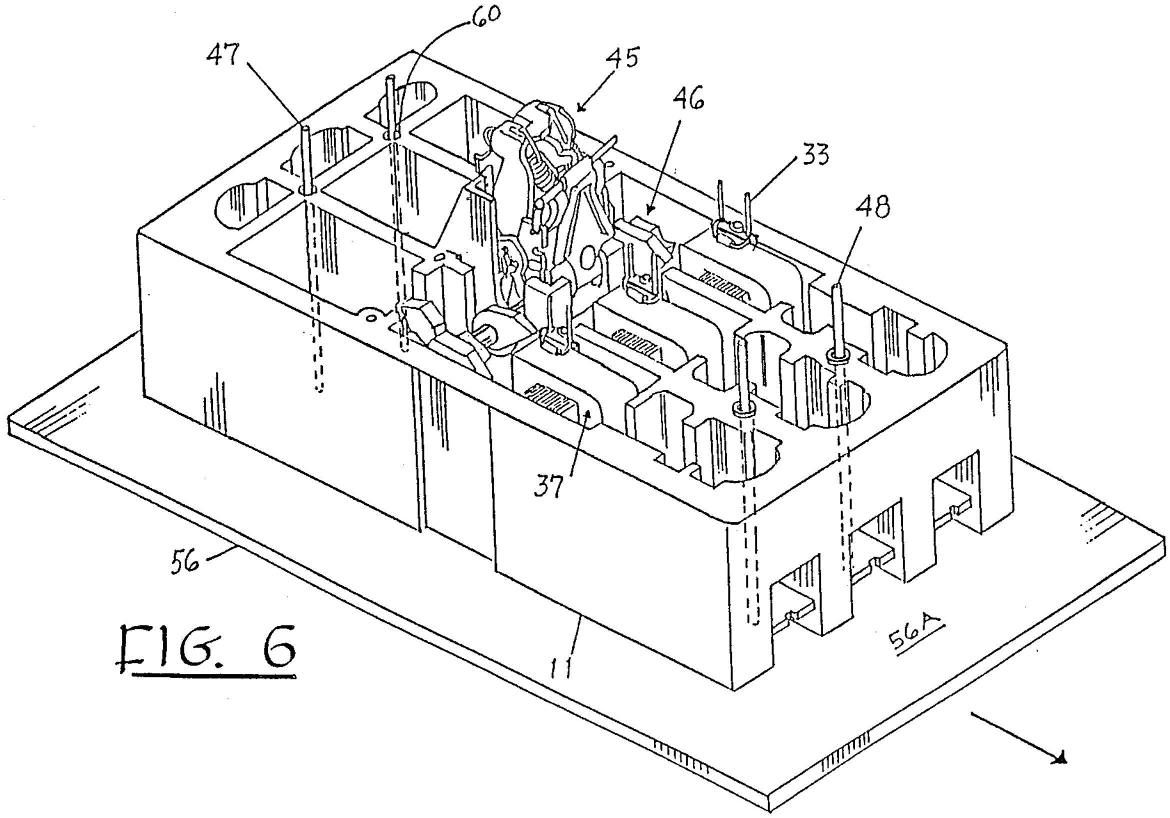
FIG. 6 is a top perspective view of the circuit breaker case of FIG. 3 after inserting the current transformer assembly.

To facilitate the robotic assembly of the circuit breaker component parts and to guide and align the circuit breaker cover with respect to the circuit breaker case, an underlying transitory support pallette or platform 56 having a first pair of upstanding positional posts 47 and a second pair of upstanding positional posts 48 fastened to a top surface 56A is employed. The circuit breaker case 11 is positioned on the platform 56 by receiving the upstanding positional posts 47, 48 within four corresponding thru-holes 60 as shown in FIG. 6. The circuit breaker operating mechanism 45 is assembled within the case along with the crossbar assembly 46 as the platform 56 moves along to the next station within the automated assembly process as indicated by the directional arrow. At one station in the automated assembly process, the current transformers 37 are inserted within the case 11 such that the upstanding pin connectors 33 align in the position dictated by the positional posts 47, 48.

Figure 7:
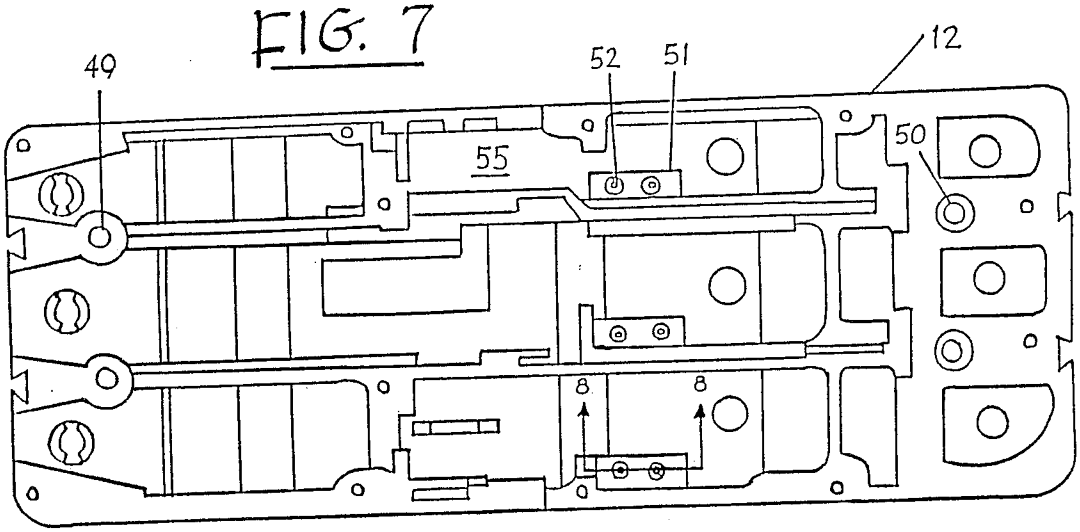
FIG. 7 is a plan view of the underside of the circuit breaker cover of FIGS. 1 and 2 prior to assembly.

To insure the accurate alignment of the transformer pin connectors 33 within the openings 59 through the printed wire board 27 (FIG. 2) the cover 12, shown in FIG. 7, is provided with corresponding pairs of openings 49, 50 which extend through the cover and receive the positional posts 47, 48 (FIG. 6) when the cover is next attached to the case. The interior bottom surface 55 of the cover is provided with integrally-formed pedestals 51 which in turn, include a pair of pin guide holes 52 extending completely through the bottom surface of the cover. A similar pair of such pedestals is provided for each of the current transformers 37 (FIG. 4) which are to be connected with the printed wire board 27 (FIG. 2).

Figure 8:
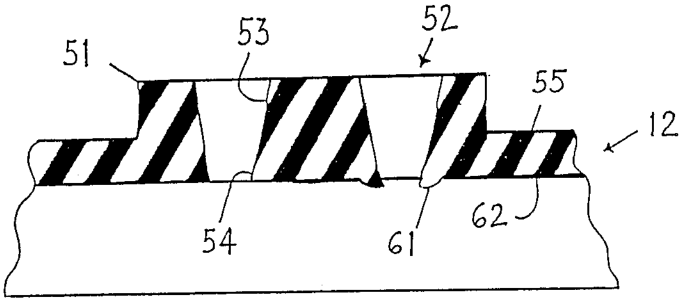
FIG. 8 is an enlarged sectional view through the plane 8—8 of a part of the cover depicted in FIG. 7.

As indicated in FIG. 8 the pedestals 51 formed on the interior bottom surface 55 of the cover 12 are arranged such that the pin guide holes 52 extend from a large diameter opening 53 at one end and taper to a smaller-sized diameter opening 54 at the opposite end thereof. At least one protrusion 61 is formed on the opposite surface 62 of the cover to facilitate the placement and location of the printed wire board 27 when the printed wire board is arranged within the cover and the transformer pin connectors 33 pass through the pin guide holes 52 next to the printed wire board pins 57 9. With the printed wire board 27 assembled in the cover, the protrusions 61 are seen to extend upwards within the thru-holes 58 formed within the printed wire board during the assembly process. The arrangement of the pedestals 51 shown in FIGS. 7 and 8 accordingly direct the insertion of the transformer pin connectors 33 through the circuit breaker cover by virtue of the alignment provided by the positional posts 47, 48 (FIG. 6) while facilitating the insertion of the printed wire board 27 within the cover by means of the protrusions 61. Still referring to FIG. 9, the accessory cover 13 is depicted prior to attachment to the circuit breaker cover 12 by means of screws 34 after which the rating plug 16 is inserted within the rating plug recess 16A formed within the accessory cover, to complete the assembly of the electronic circuit breaker.

Figure 9A:
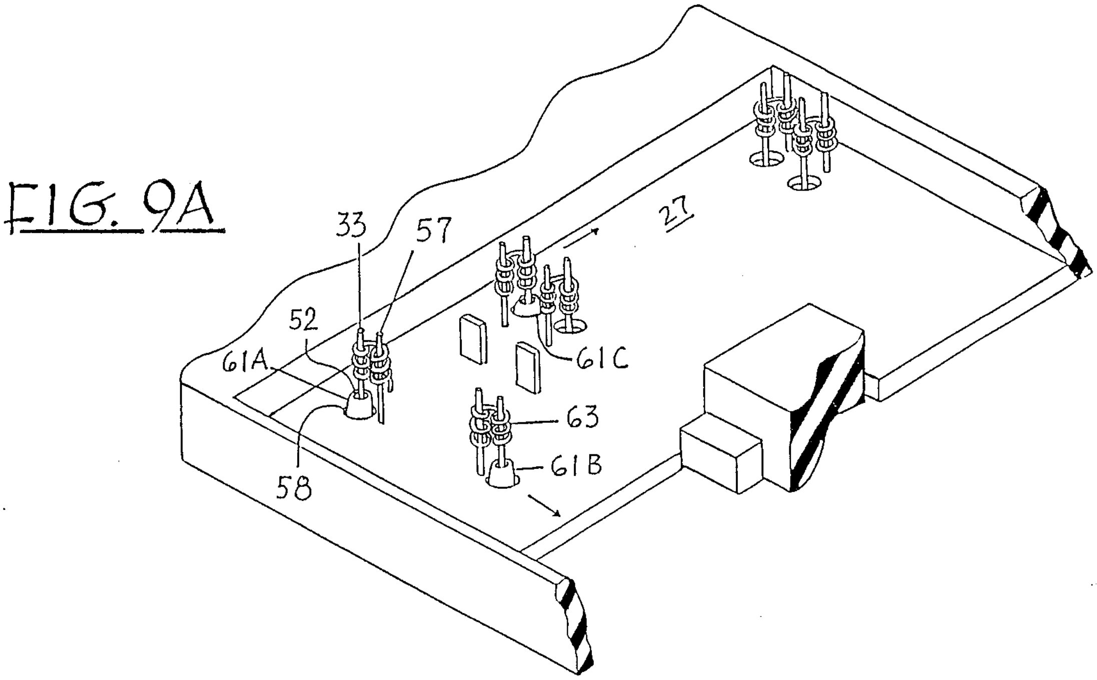
FIG. 9A is an enlarged top perspective view of a part of the circuit breaker depicted in FIG. 6 after connecting the printed wire board pins to the current transformer wire connectors.
Figure 9:
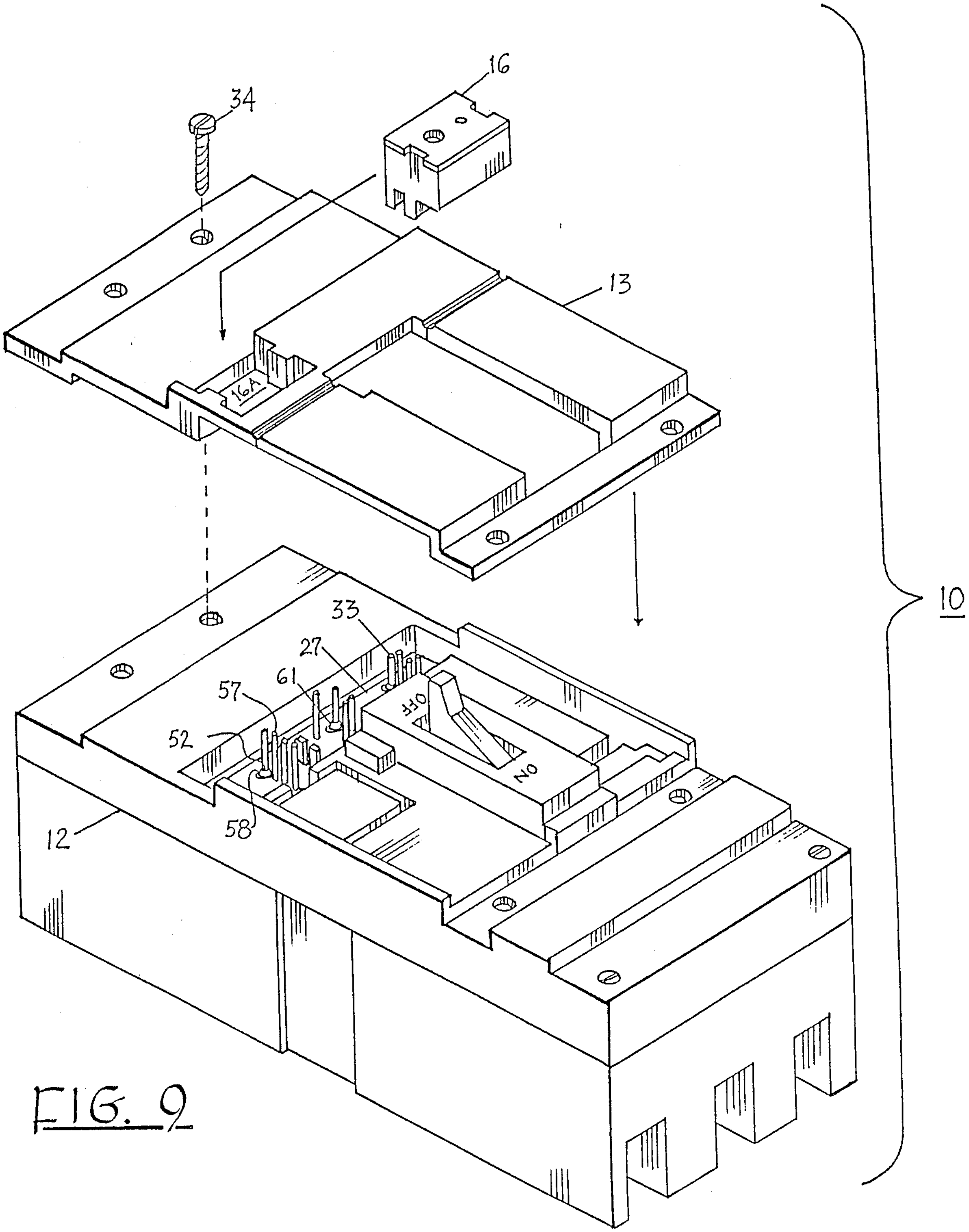
FIG. 9 is a top perspective view of the circuit breaker depicted in FIG. 4 prior to connecting the printed wire board pins to the current transformer pin connectors and attaching the accessory cover to the circuit breaker over.

The transformer pin connectors 33 are electrically connected with the printed wire board pins 57 by a wire-wrapped procedure which consists of the tight enveloping of the transformer pin connectors 33 and the printed wire board pins 57 by means of the bare wire conductor 63 as shown in FIG. 9A. As described earlier, locating the thru-hole 58 next to the printed wire board pin 57 insures accurate placement of the transformer pin connector 33 next to the printed wire board pin, when the pin connector is inserted through the pin guide hole 52. To accurately align the printed wire board 27 with respect to the pin guide holes 52, three protrusions 61A, 61B, 61C are used. Protrusions 61A, 61B insure alignment in the forward direction while protrusions 61A and 61C insure alignment in the lateral direction as indicated by the directional arrows.

Having thus described our invention, what we claim as new and desire to secure by Letters Patent is:

1. An electronic trip circuit interrupter comprising:

a molded plastic case and cover;

a pair of separable contacts under control of an operating mechanism for separating said contacts upon occurrence of an overcurrent condition through a protected circuit;

at least one current transformer within said case sensing circuit current through said contacts and having a plurality of upstanding pin connectors extending from a top surface;

a printed wire board containing a trip circuit arranged on one surface of said cover and including a corresponding plurality of thru-holes receiving said transformer pin connectors; and means formed on an opposite surface of said cover facilitating passage of said transformer connectors through openings in said cover nd through said thruholes in said printed wire board.

2. The electronic trip circuit interrupter of claim 1 wherein said cover means comprises at least one pedestal integrally-formed on said opposite surface of said cover and including at least one first thru-hole, said first thru-hole tapering from said one surface to said opposite surface of said cover.

3. The electronic trip circuit interrupter of claim 2 including at least one protuberance integrally-formed on said other surface for receiving said first thru-hole in said printed wire board.

4. The electronic trip circuit interrupter of claim 1 including a first pair of passages through one end of both said case and said cover and a second pair of passages through an opposite end of said case and said cover for receiving corresponding posts upstanding from a support plate for aligning said case and said cover during assembly of said cover to said case.

5. The electronic trip circuit interrupter of claim 1 including a plurality of upstanding pin connectors on said printed wire board connected with said transformer pin connectors by means of wrapped wire conductors.

6. The electronic trip circuit interrupter of claim 1 including an accessory cover arranged on said circuit interrupter cover covering said printed wire board.

7. The electronic trip circuit interrupter of claim 6 including a rating plug within said accessory cover for setting the ampere rating of said trip unit circuit.

8. The electronic trip circuit interrupter of claim 1 wherein said current transformer includes a bobbin and wherein said pin connectors are supported on a platform integrally-formed on said bobbin.

9. The electronic trip circuit interrupter of claim 8 wherein said platform includes a second thru-hole and said case includes a post upstanding from one end of a pedestal integrally-formed on said case, said post being received within said second thru-hole.

10. The electronic trip circuit interrupter of claim 8 wherein said bobbin further includes extensions on opposite sides thereof and said case includes corresponding vertical slots integrally-formed on said case, said extensions being received within said slots.

* * * * *